UNITED STATES PATENT OFFICE.

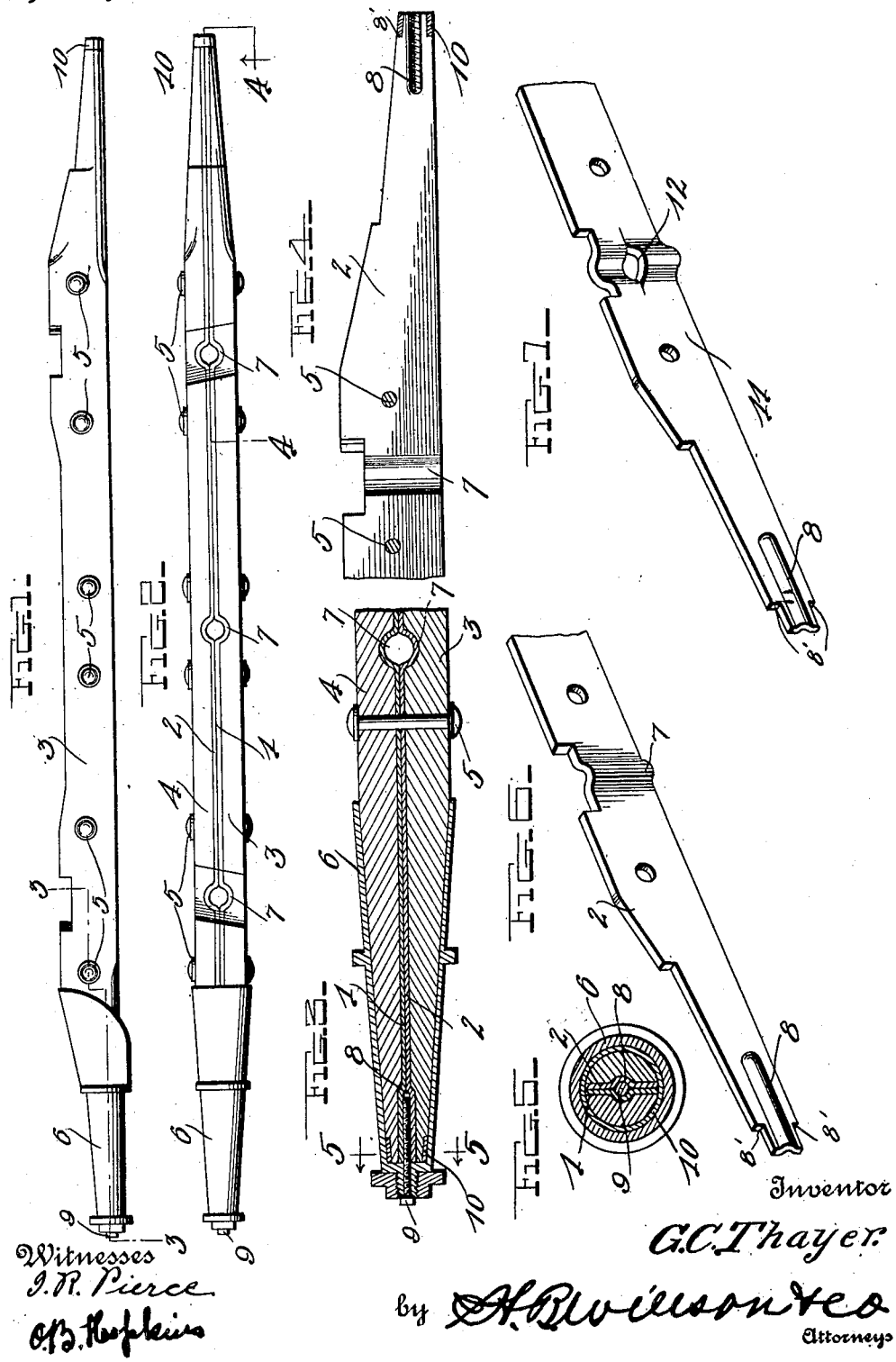

GARRISON C. THAYER, OF BARTLESVILLE, OKLAHOMA.

REINFORCED AXLE.

1,019,998.  Specification of Letters Patent.  Patented Mar. 12, 1912.

Application filed July 10, 1911. Serial No. 637,852.

*To all whom it may concern:*

Be it known that I, GARRISON C. THAYER, a citizen of the United States, residing at Bartlesville, in the county of Washington and State of Oklahoma, have invented certain new and useful Improvements in Reinforced Axles; and I do declare the following to be a full, clear, and exact description of the invention, such as will enable others skilled in the art to which it appertains to make and use the same.

This invention relates to improvements in vehicle axles.

The object of the invention is to provide a simply constructed, strong and cheaply manufactured axle.

With this and other objects in view, the invention consists of certain novel features of construction, combination and arrangement of parts as will be more fully described and particularly pointed out in the appended claim.

In the accompanying drawings: Figure 1 represents a side elevation of an axle constructed in accordance with this invention; Fig. 2 is a top plan view thereof; Fig. 3 is a longitudinal horizontal section taken on the line 3—3 of Fig. 1; Fig. 4 is a longitudinal vertical section taken on the line 4—4 of Fig. 2; Fig. 5 is a transverse section taken on the line 5—5 of Fig. 3 and looking in the direction of the arrows; Fig. 6 is a detail perspective view of a portion of one of the reinforcing plates; Fig. 7 is a similar view of a slightly modified form of plate.

In the embodiment illustrated an axle is shown composed of a metal core and an outer wooden casing or shell rigidly connected, the core comprising two metal plates 1 and 2 and the shell two outer wooden plates 3 and 4, said plates being secured together by transversely arranged bolts as 5. Any desired number of bolts may be employed for securely clamping the members together. These plates are tapered toward their opposite ends as shown to provide for the application of the axle skeins 6 thereto.

The plates 1 and 2 are provided with a plurality of registering outwardly bulged transversely extending semi-circular grooves as 7 which, when the plates are assembled form bolt holes for the passage of the bolts which connect the axle to the bolster, the upper edges of said plates being recessed above the grooved portion 7 to receive and house the heads of the bolts which secure the axle to the bolster. The opposite ends of these plates 1 and 2 are also provided with longitudinally extending semi-cylindrical grooves as 8 which register with each other to form bores which are screw-threaded on their inner faces to receive lag screws as 9 for securing the skeins 6 to the axle. Ferrules, as 10, are applied to the ends of the axle, fitting in recesses formed on the outer faces of the wooden members thereof and are designed to prevent the spreading of the axle ends when the lag screws 9 are inserted. The inner end of said ferrules abut against shoulders 8' formed near the ends of the plates 1 and 2.

The metal core formed by the plates 1 and 2 provides a very strong light weight axle which will carry two-thirds more weight than any wooden axle, and will cost but a trifle more. It is preferable that the inner reinforcing core be made of two plates in order that the bolt holes for connecting it with the bolster may be readily formed therein, but a single plate may be employed if desired such as is shown at 11 in Fig. 7. This plate 11 is provided with a plurality of longitudinally extending longitudinally spaced slits as 12 arranged between the edges of the plate and the upper portion of the plate adjacent each slit is bent in one direction and the lower portion in the opposite direction to provide bolt receiving members as shown in Fig. 7.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as defined in the appended claim.

I claim as my invention:

An axle comprising a wooden shell having a metal core extending from end to end thereof and composed of two correspondingly shaped plates arranged in contact with each other and having transversely extending registering grooves in their faces between their ends forming bolt receiving apertures, the ends of said plates having longitudinally extending grooves in their inner faces, the grooves in one plate registering with those in the other and threaded to form sockets to receive skein securing screws, ferrules encircling the ends of said shell to bind it to said core, means for securing said core and shell together between their ends, skeins on the ends of said axle and lag screws passing through said skeins and engaging the sockets in said core.

In testimony whereof I have hereunto set my hand in presence of two subscribing witnesses.

GARRISON C. THAYER.

Witnesses:
P. A. SOMPAGROE,
SAMMIE HUGHES.